(12) United States Patent
Thomas et al.

(10) Patent No.: US 12,192,497 B2
(45) Date of Patent: Jan. 7, 2025

(54) SEGMENTED BITSTREAM PROCESSING USING FENCE IDENTIFIERS

(71) Applicant: ATI TECHNOLOGIES ULC, Markham (CA)

(72) Inventors: Sonu Thomas, Markham (CA); Arun Bhaskaran Nair, Markham (CA); Kurian Thomas, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/091,467

(22) Filed: Dec. 30, 2022

(65) Prior Publication Data

US 2024/0223788 A1 Jul. 4, 2024

(51) Int. Cl.
*H04N 19/423* (2014.01)
*H04L 65/75* (2022.01)
*H04N 19/184* (2014.01)
*H04N 19/46* (2014.01)

(52) U.S. Cl.
CPC ........... *H04N 19/423* (2014.11); *H04L 65/75* (2022.05); *H04N 19/184* (2014.11); *H04N 19/46* (2014.11)

(58) Field of Classification Search
CPC .... H04N 19/423; H04N 19/184; H04N 19/46; H04N 19/86; H04N 19/172; H04N 19/89; H04L 65/75

USPC ......................................................... 709/247
See application file for complete search history.

(56) References Cited

U.S. PATENT DOCUMENTS

| | | | |
|---|---|---|---|
| 6,915,263 B1 * | 7/2005 | Chen ................. | H04B 1/66 704/226 |
| 7,624,255 B1 | 11/2009 | Rouet et al. | |
| 10,176,546 B2 | 1/2019 | Nystad | |
| 10,445,852 B2 | 10/2019 | Potter et al. | |
| 10,496,574 B2 | 12/2019 | Fleming et al. | |
| 11,030,105 B2 | 6/2021 | Sandoz et al. | |
| 2009/0003446 A1 * | 1/2009 | Wu ..................... | H04N 19/176 375/E7.19 |
| 2016/0055615 A1 * | 2/2016 | Huang ................. | G06F 1/324 345/505 |
| 2021/0283499 A1 * | 9/2021 | Li ...................... | H04N 19/85 |
| 2021/0368173 A1 * | 11/2021 | Taquet ............... | H04N 19/174 |
| 2022/0182682 A1 * | 6/2022 | Nelson ............... | H04N 19/86 |
| 2022/0321899 A1 * | 10/2022 | Matsuba ............. | H04N 19/593 |
| 2023/0013997 A1 * | 1/2023 | Hong .................. | H04N 19/14 |

* cited by examiner

*Primary Examiner* — Tan Doan (57) ABSTRACT

A bitstream encoding or decoding job is broken up into a plurality of segments, each of which is independent from subsequent segments and corresponds to a respective fence identifier. The segments are individually processed and progress is indicated using the fence identifiers. In some cases, a first segment is encoded, transmitted, decoded, and processed before a second segment is encoded. As a result, in some cases, segment statuses are more easily tracked, hardware is used more efficiently, end-to-end processing time is reduced, and less communication network bandwidth is used.

20 Claims, 5 Drawing Sheets

SEGMENTED BITSTREAM PROCESSING USING FENCE IDENTIFIERS

BACKGROUND

Bitstream applications, such as video streaming applications, remote desktop applications, cloud gaming services, or virtual desktop infrastructure (VDI) applications include a producer, such as a server of a content provider, that generates data being streamed and a consumer, such as a client system, that receives the data being streamed and provides the data to a user. Because some of the data refers to other portions of the data the data is difficult to process separately. Accordingly, the data is generally encoded as a whole, transferred as a whole, decoded as a whole, and then processed as a whole. In some cases, this process takes an undesirable amount of time. The amount of data transferred in this process is also increasing over time as bitstream applications increase image resolutions more quickly than network bandwidths increase. The amount of time taken increases with the amount of data transferred.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

A bitstream processing system includes a producer and a consumer. In some embodiments, the producer identifies a plurality of portions of a bitstream encoding job as independent segments. In response to an encoded segment being written to an output buffer, the producer indicates that the segment is complete using a fence identifier corresponding to the segment. The encoded segment and the fence identifier are sent to the consumer, where the segment is decoded and processed based on the fence identifier. As a result, hardware (e.g., encoding hardware, decoding hardware, transmission hardware, processing hardware, or any combination thereof) is used more efficiently because the bitstream is pipelined. For example, in some cases, processing of a first segment is performed while a second segment is being encoded. Therefore, throughput is increased, as compared to a system where bitstreams are encoded as a whole, transferred as a whole, decoded as a whole, and then processed as a whole.

Further, because fence identifiers are used to indicate independent segments, the system more easily tracks and manages segments as compared to a system that continually polls a processor (e.g., a central processing unit polling a graphics processing unit) to determine whether segments are available. As a result, less power and processor cycles are consumed by repeatedly polling the processor to determine segment progress.

As used herein, a first segment being "independent" of other segments of a processing job refers to a set of data that does not use data included in portions of the processing job that are to be executed subsequently to the set of instructions. Accordingly, if a first segment is to be processed before a second segment and the first segment is "independent" of the second segment, the first segment does not use data included in the second segment and can thus be processed without the second segment. However, in some cases, the second segment uses data included in the first segment. As a result, in the described embodiments, a fence or memory barrier is used to separate and impose an order upon the processing of the segments. "Data" in this context refers to the data being processed and not to headers, pointers to buffers or registers, etc.

The techniques described herein are, in different embodiments, employed using any of a variety of processors (e.g., single core central processing units (CPUs) or multi-core CPUs) or parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example systems and methods in which processing modules are employed. However, it will be understood that the systems and techniques described herein apply equally to the use of other types of parallel processors unless otherwise noted.

Figure 1:
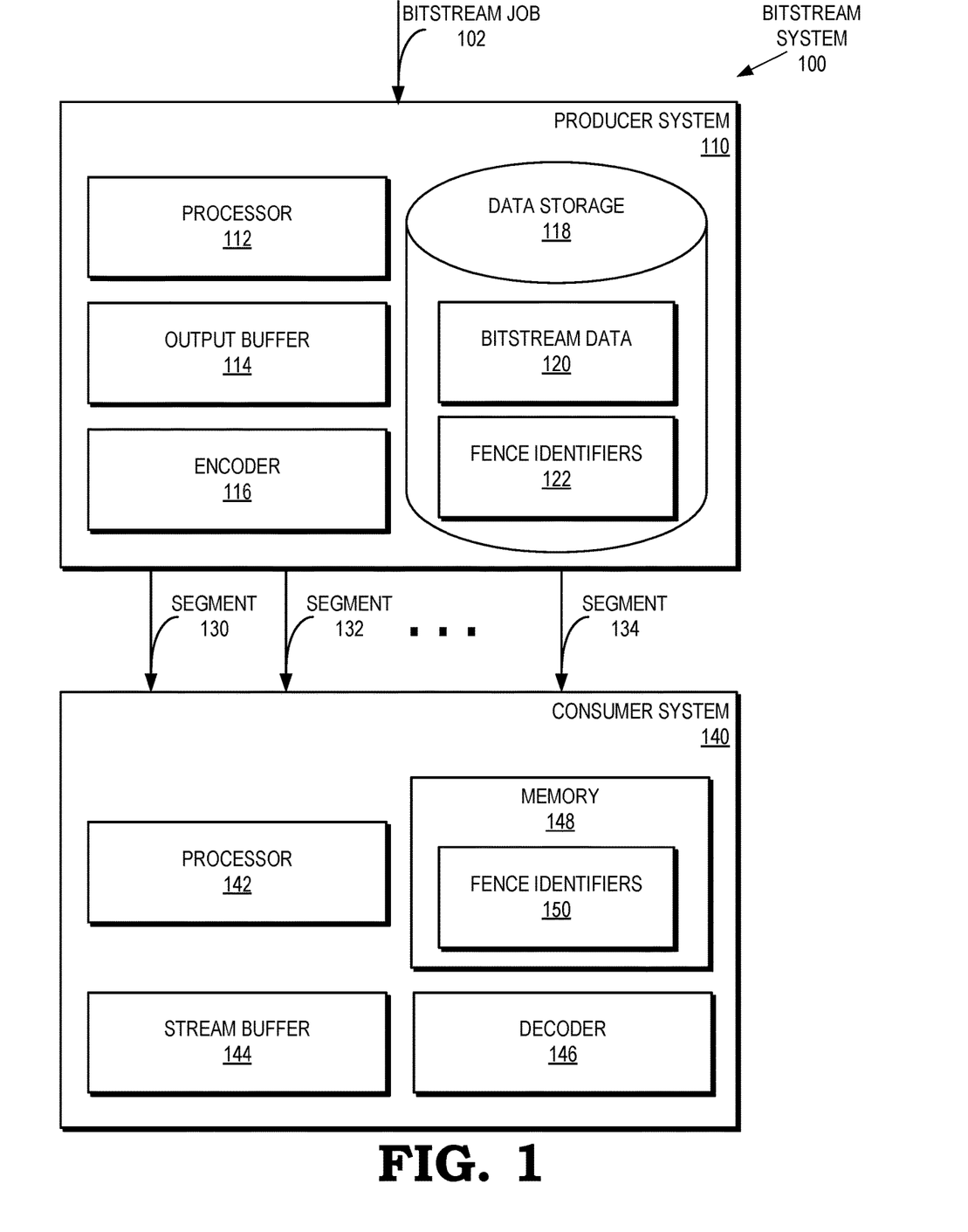
FIG. 1 is a block diagram of a segmented bitstream processing system in accordance with some embodiments.

FIG. 1 illustrates a block diagram of an embodiment of a segmented bitstream processing system in accordance with some embodiments. In the illustrated embodiment, the segmented bitstream processing system, referred to as bitstream system 100, includes at least a producer system 110 and a consumer system 140. Producer system 110 includes processor 112, output buffer 114, encoder 116, and data storage 118. Data storage 118 includes bitstream data 120 and fence identifiers 122. Consumer system 140 includes processor 142, stream buffer 144, decoder 146, and memory 148. Memory 148 includes fence identifiers 150. For clarity and ease of explanation, FIG. 1 only includes the components listed above. However, in various embodiments, additional components, such as encoders/decoders, network transmission hardware, user input devices, memory devices, etc. are contemplated. Further, in some embodiments, fewer components are contemplated. For example, in some embodiments, producer system 110 does not include output buffer 114 or consumer system 140 does not include stream buffer 144. In some embodiments, various components are located in other locations or are combined. For example, in some embodiments, stream buffer 144 is part of processor 142. As another example, as discussed below with reference to FIG. 5, in some embodiments, producer system 110 and consumer system 140 are integrated into a single device with, for example, processor 112 being a CPU and processor 142 being a GPU, with processor 112 being a GPU and processor 142 being a CPU, with processor 112 being a CPU and processor 142 being a CPU, or with processor 112 being a GPU and processor 142 being a GPU.

In the illustrated embodiment, bitstream job 102 is received at producer system 110. In some embodiments, bitstream job 102 is part of a remote rendering operation of a cloud-based gaming application, a remote desktop application, or a video streaming application and requests that data (e.g., a plurality of images) be sent from producer system 110 to consumer system 140. In the illustrated embodiment, bitstream job 102 specifies that an encoded version of bitstream data 120 be sent to consumer system 140. In some cases, bitstream job 102 explicitly specifies that bitstream data 120 be encoded. In other cases, producer system 110 determines that bitstream data 120 should be encoded (e.g., because bitstream data 120 is to be sent over a network), but bitstream job 102 does not explicitly specify that bitstream data 120 be encoded. In various embodiments, bitstream job 102 is received from consumer system 140, generated by producer system 110, or received from another system.

In response to receiving bitstream job 102, processor 112 causes encoder 116 to encode bitstream data 120 and then the resulting encoded data is stored in output buffer 114 to be sent to consumer system 140 as part of segments 130-134. Processor 112 identifies a plurality of portions of bitstream data 120 as segments that are independent of other portions of bitstream data. In some cases, the identification of segments is performed based on one or more indications from bitstream job 102, from data stored with bitstream data 120, or from another source. In other cases, processor 112 determines that the plurality of portions are segments (e.g., by compiling at least a portion of bitstream data 120). In various embodiments, various amounts of data are identified as segments. In some cases, a first segment has a different amount of data than a second segment. For example, a first segment includes some but not all of an image frame of a video bitstream and a second segment includes two full image frames.

Subsequent to at least one segment being identified, a segment is encoded by encoder 116 and stored at output buffer 114 to be sent to consumer system 140. For example, a segment is identified by processor 112, encoded by encoder 116, sent to output buffer 114, and eventually sent to consumer system 140 as segment 132.

In some embodiments, a plurality fence identifiers of fence identifiers 122 are associated with respective identified segments such that each identified segment is associated with a fence identifier. In other embodiments, fence identifiers are created at fence identifiers 122 such that each identified segment is associated with a respective fence identifier. In some embodiments, the fence identifiers are associated with the respective segments in response to identifying the segments. In other embodiments, the fence identifiers are associated with the respective segments at another time, such as in response to encoding the segments. In some cases, data associated with the fence identifiers is modified to indicate that encoding of a segment is complete. In some embodiments, fence identifiers 122 are sent with their respective segments to consumer system 140. In other embodiments, fence identifiers 122 are sent to consumer system 140 separately from their respective segments (e.g., collectively before segment 130 is sent to consumer system 140).

Accordingly, producer system 110 encodes the segments in a pipelined manner such that, in some cases, some segments are sent to consumer system 140 prior to encoding beginning on other segments. In some cases, segments are sent to consumer system 140 prior to portions of bitstream data 120 being identified as segments. As a result, end-to-end encoding and transmission time is reduced, as compared to a system that encodes all bitstream data before sending any of the bitstream data to a consumer system. Further, the transmission of bitstream data 120 to consumer system 140 uses fewer network resources, as compared to the system that encodes all bitstream data before sending any of the bitstream data to a consumer system.

In the illustrated embodiment, segments 130-134 are received at consumer system 140 from producer system 110. Further, corresponding fence identifiers are received and stored in memory 148 as fence identifiers 150. In response to receiving a segment (e.g., segment 132), consumer system 140 (e.g., processor 142 or another device within consumer system 140 such as another processor) identifies the segment as a segment using the respective fence identifier. Decoder 146 is instructed to decode the segment and store the result in stream buffer 144. In the illustrated embodiment, image processing operations are then performed upon the decoded segment by processor 142. In some cases, the respective fence identifier is updated in response to decoding the segment, in response to the image processing operations, or both. In some embodiments, stream buffer 144 is part of memory 148, fence identifiers 150 are stored within stream buffer 144, or both.

As a result, in some cases, segment 132 is decoded and processed by processor 142 prior to another segment (e.g., segment 134) being received by consumer system 140. Accordingly, end-to-end decoding time is reduced, as compared to a system that receives all bitstream data before decoding any of the bitstream data. Further, because fence identifiers are updated as the segments are modified, the statuses of the segments are more easily tracked, as compared to a system that does not use fence identifiers associated with the segments.

Figure 2:
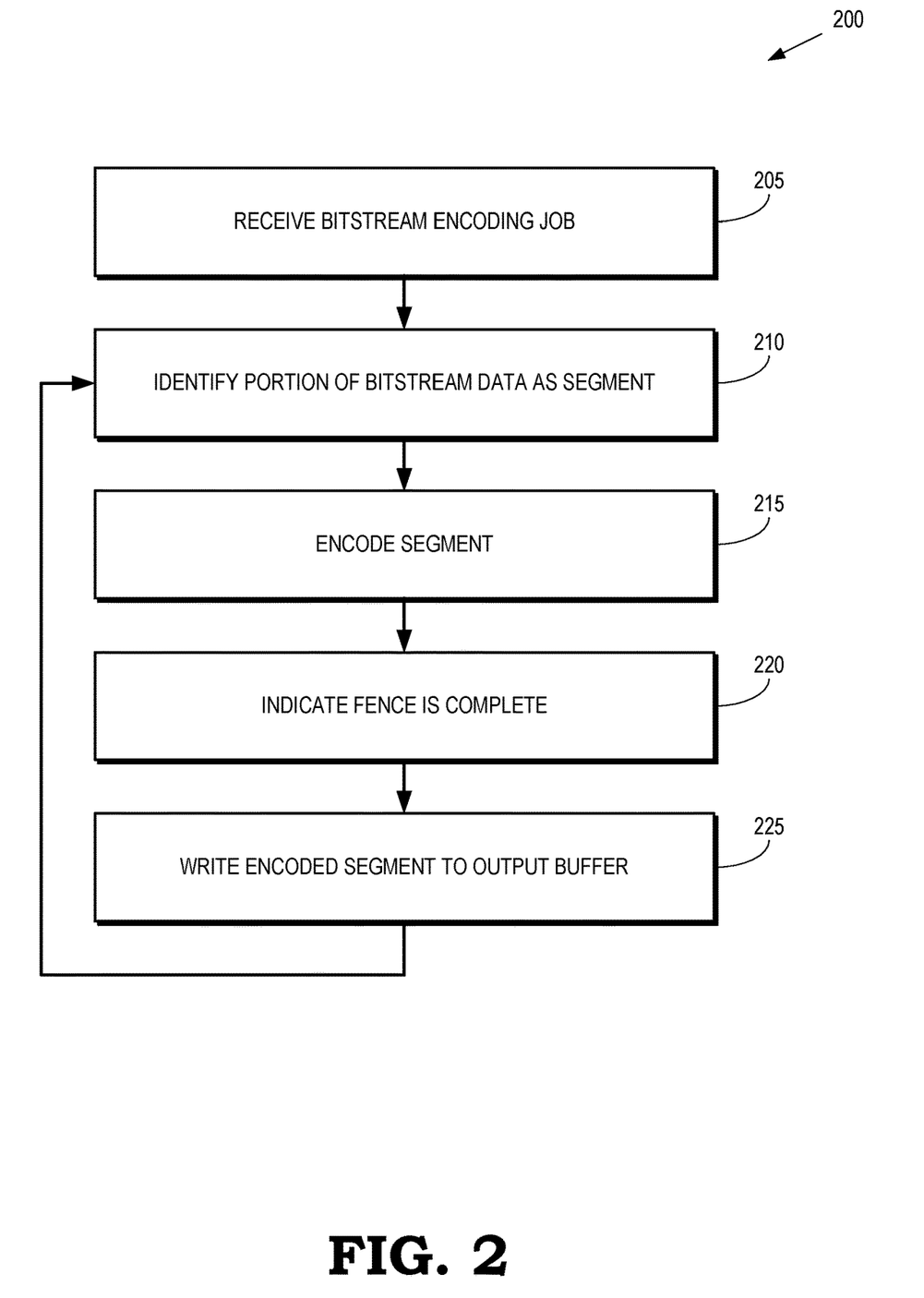
FIG. 2 is a flow diagram of a method of encoding a bitstream in accordance with some embodiments.
Figure 3:
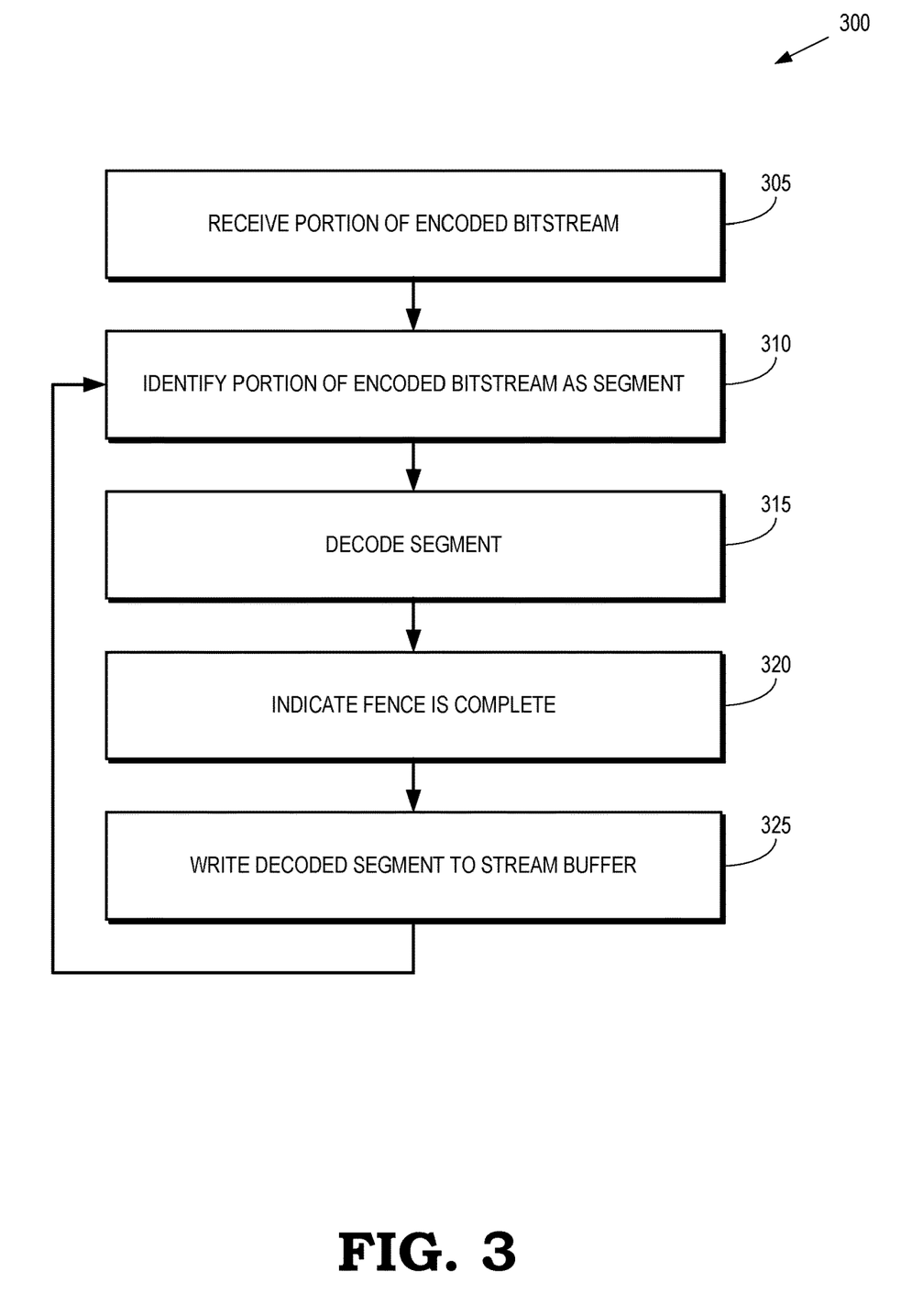
FIG. 3 is a flow diagram of a method of decoding a bitstream in accordance with some embodiments.

FIGS. 2 and 3 illustrate example methods of encoding and decoding a bitstream, respectively, in accordance with some embodiments. In some embodiments, the method of FIG. 3 is performed in response to the method of FIG. 2. In other embodiments, only one method is performed. Several different systems are contemplated, such as a system where a server sends encoded data to a client or a system where a CPU sends encoded data to a GPU.

FIG. 2 is a flow diagram illustrating a method of encoding a bitstream in accordance with some embodiments. In some embodiments, method 200 is initiated by one or more processors in response to one or more instructions stored by a computer readable storage medium. In some embodiments, various portions of method 200 occur in a different order than is illustrated. For example, in some cases, the fence is indicated as complete in block 220 subsequent to writing the encoded segment to the output buffer in block 225. As another example, in some cases, all of the portions of the bitstream data are identified as segments at block 210 before any of the segments are encoded, so block 225 would loop back to block 215.

At block 205, a bitstream encoding job is received. For example, producer system 110 of FIG. 1 receives bitstream job 102 from consumer system 140. At block 210, a portion of bitstream data is identified as a segment. For example, a portion of bitstream data 120 is identified as a second segment by processor 112.

At block 215, the identified segment is encoded. For example, encoder 116 encodes the second segment. At block 220, a fence associated with the segment is indicated as being complete. For example, in response to the second segment being encoded, processor 112 modifies an associated fence of fence identifiers 122 to indicate that the second segment is encoded.

At block 225, the encoded segment is written to an output buffer. For example, in response to the second segment being encoded, the second segment is written to output buffer 114 in preparation for being sent to consumer system 140 as segment 132. Accordingly, a method of encoding a bitstream is depicted.

FIG. 3 is a flow diagram illustrating a method of decoding a bitstream in accordance with some embodiments. In some embodiments, method 300 is initiated by one or more processors in response to one or more instructions stored by a computer readable storage medium. In some embodiments, various portions of method 300 occur in a different order than is illustrated. For example, in some cases, the fence is indicated as complete in block 320 subsequent to writing the decoded segment to the stream buffer in block 325. As another example, in some cases, multiple portions of the encoded bitstream are received at block 305 and all of the received portions of the encoded bitstream are identified as segments at block 310 before any of the segments are decoded, so block 325 would loop back to block 315.

At block 305, one or more portions of an encoded bitstream are received. For example, consumer system 140 of FIG. 1 receives segment 132 from producer system 110. At block 310, a portion of the encoded bitstream is identified as a segment. For example, the received portion of the encoded bitstream is identified as a second segment by processor 142.

At block 315, the identified segment is decoded. For example, decoder 146 decodes the second segment. At block 320, a fence associated with the segment is indicated as being complete. For example, in response to the second segment being decoded, processor 142 modifies an associated fence of fence identifiers 150 to indicate that the second segment is decoded.

At block 325, the decoded segment is written to a stream buffer. For example, in response to the second segment being decoded, the second segment is written to stream buffer 144 in preparation for being sent to processor 142 for image processing operations. Accordingly, a method of decoding a bitstream is depicted.

Figure 4:
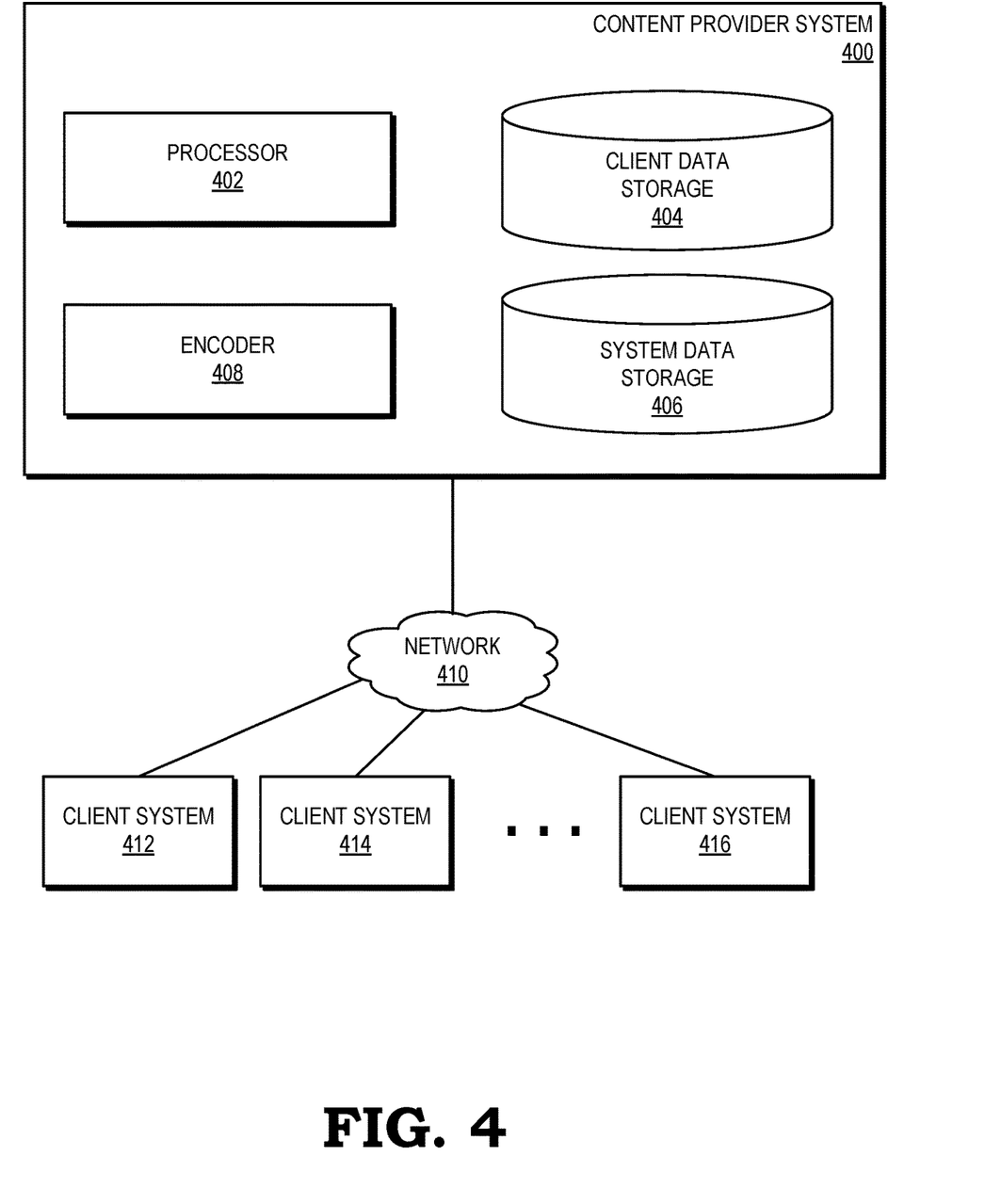
FIG. 4 is a block diagram of a network system that includes at least a portion of a segmented bitstream processing system in accordance with some embodiments.

FIG. 4 is a block diagram depicting a network system that includes at least a portion of a segmented bitstream processing system according to some embodiments. The network system includes a content provider system 400, a network 410, a client system 412, a client system 414, and a client system 416. The content provider system 400 includes at least a processor 402, a client data storage 404, a system data storage 406, and an encoder 408. In some embodiments, the content provider system 400 corresponds to producer system 110 of FIG. 1. Additionally, in some embodiments, at least one of client system 412, client system 414, or client system 416 corresponds to consumer system 140 of FIG. 1. Some embodiments of content provider system 400 include other buses, bridges, switches, routers, encoders/decoders, memory devices, network interface devices, and the like, which are not shown in FIG. 4 in the interest of clarity. Although some elements are depicted individually (e.g., processor 402 or system data storage 406), in some embodiments, these elements are collections of multiple devices which are not necessarily physically adjacent. Further, in some cases, some devices which are depicted separately are part of a single device (e.g., processor 402 and encoder 408).

Content provider system 400 provides bitstream services (e.g., video streaming applications, remote desktop applications, cloud gaming services, or VDI applications) to client system 412, client system 414, and client system 416. In the illustrated embodiment, content provider system 400 stores data (e.g., game state data) for each client in client data storage 404 and system data such as bitstream data or fence identifiers in system data storage 406. Processor 402 executes instructions related to providing streaming services to client systems 412-416. Encoder 408 encodes data to be sent to client systems 412-416 prior to sending the data across network 410.

Figure 5:
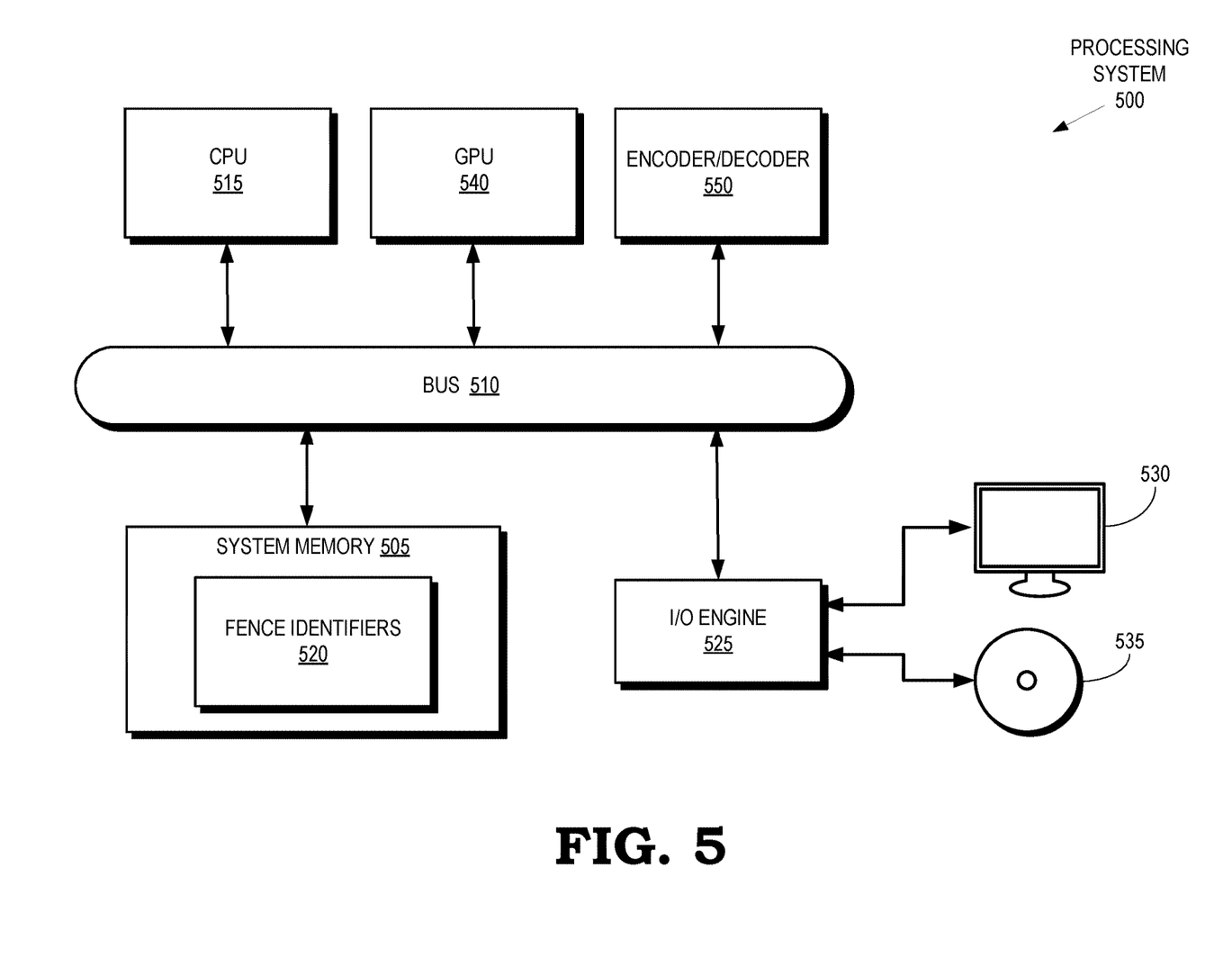
FIG. 5 is a block diagram of a processing system that includes at least a portion of a segmented bitstream processing system in accordance with some embodiments.

FIG. 5 is a block diagram depicting a processing system 500 that includes at least a portion of a segmented bitstream processing system according to some embodiments. In various embodiments, processing system 500 corresponds to producer system 110 of FIG. 1, consumer system 140, one or more of client systems 412-416 of FIG. 4, or any combination thereof. Processing system 500 includes or has access to a system memory 505 or other storage component that, in some embodiments, is implemented using a non-transitory computer readable medium such as a dynamic random-access memory (DRAM). In various embodiments, system memory 505 additionally or alternatively includes or is implemented using other types of memory including static random-access memory (SRAM), nonvolatile RAM, and the like. In the illustrated embodiment, system memory 505 includes fence identifiers 520, which correspond to fence identifiers 150 of FIG. 1. In various embodiments, system memory 505 includes a stream buffer corresponding to stream buffer 144 of FIG. 1. Processing system 500 also includes a bus 510 to support communication between entities implemented in processing system 500, such as system memory 505. Some embodiments of processing system 500 include other CPUs, GPUs, buses, bridges, switches, routers, encoders/decoders, network interface devices, and the like, which are not shown in FIG. 5 in the interest of clarity.

Processing system 500 includes GPU 540. In some embodiments, GPU 540 renders images for presentation on a display 530. For example, in some cases, the GPU 540 renders objects to produce values of pixels that are provided to display 530, which uses the pixel values to display an image that represents the rendered objects. In the illustrated embodiment, GPU 540 communicates with system memory 505 over bus 510. However, some embodiments of GPU 540 communicate with system memory 505 over a direct connection or via other buses, bridges, switches, routers, and the like. In some embodiments, GPU 540 is an image processor that executes image processing instructions, such as instructions that process decoded bitstream data, and GPU 540 stores information in system memory 505 such as the results of the executed instructions. In various embodiments, GPU 540 includes a stream buffer corresponding to stream buffer 144 of FIG. 1 and is configured to read decoded bitstream data from the stream buffer.

Processing system 500 includes an encoder/decoder 550 configured to receive data and convert the data into an encoded format. Encoder/decoder 550 is further configured to receive encoded data and convert the data into a format that one or more portions of processing system 500 (e.g., GPU 540) interprets as instructions. Although encoder/decoder 550 is depicted as being a separate device, in some embodiments, encoder/decoder 550 is part of CPU 515, GPU 540, or I/O engine 525. Further, in some embodiments, the encoder portion of encoder/decoder 550 is part of one device (e.g., CPU 515) and the decoder portion of encoder/decoder 550 is part of another device (e.g., GPU 540). As a result, in some embodiments, encoded data is sent from one device (e.g., CPU 515) to another device (e.g., GPU 540) using BUS 510.

Processing system 500 also includes a central processing unit (CPU) 515 configured to execute instructions concurrently or in parallel. The CPU 515 is connected to the bus 510 and, in some cases, communicates with GPU 540 and system memory 505 via bus 510. In some embodiments, CPU 515 executes instructions such as receiving segments and fence identifiers and sending the data to encoder/decoder 550. Further, in some embodiments, CPU 515 causes identified or decoded data to be stored in system memory 505.

In some embodiments, CPU 515 is configured to send (generated or received) bitstream data and send the bitstream data to GPU 540 for processing (e.g., image processing). In such embodiments, CPU 515 corresponds to processor 112 of FIG. 1 and GPU 540 corresponds to processor 142. In some embodiments, both CPU 515 and GPU 540 store data such as fence identifiers and bitstream data in system memory 505 (i.e., both data storage 118 and memory 148 correspond to system memory 505). In other embodiments, CPU 515 and GPU 540 store some or all of bitstream data and fence identifiers in separate memory devices. In some embodiments, GPU 540 is configured to send (generated or received) bitstream data to CPU 515 for processing. In such embodiments, CPU 515 corresponds to processor 142 of FIG. 1 and GPU 540 corresponds to processor 112. In some embodiments, GPU 540 is configured to send (generated or received) bitstream data to another GPU (not shown) for processing. In some embodiments, CPU 515 is configured to send (generated or received) bitstream data to another CPU (not shown) for processing.

An input/output (I/O) engine 525 handles input or output operations associated with display 530, as well as other elements of processing system 500 such as input/output device(s), which include keyboards, mice, game controllers, audio devices such as speakers or headphones, printers, external disks, and the like. I/O engine 525 is coupled to bus 510 so that I/O engine 525 is able to communicate with system memory 505, GPU 540, and CPU 515. In the illustrated embodiment, I/O engine 525 is configured to read information stored on an external storage component 535, which is implemented using a non-transitory computer readable medium such as a compact disk (CD), a digital video disc (DVD), and the like. In some cases, I/O engine 525 writes information to external storage component 535, such as the results of processing by GPU 540 or CPU 515.

In some embodiments, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A method comprising:
receiving a bitstream encoding job to send an encoded version of bitstream data to a consumer as a bitstream; and
in response to encoding a first segment of the bitstream data based on the first segment being independent from other segments of the bitstream data, but prior to completing encoding of the bitstream data:
indicating, using a first fence identifier, that the first segment has been encoded; and
writing the encoded first segment to an output buffer.

2. The method of claim 1, further comprising:
prior to completing encoding of the bitstream data, sending the encoded first segment from the output buffer to the consumer.

3. The method of claim 1, wherein the first segment is independent of the other segments of the bitstream data based on the first segment being able to be processed without the other segments.

4. The method of claim 1, further comprising receiving an indication of a plurality of segments comprising the first segment and the other segments with the bitstream data.

5. The method of claim 1, further comprising:
associating the first segment with the first fence identifier based on the first segment being independent from the other segments of the bitstream data.

6. The method of claim 1, further comprising:
receiving an indication that the first segment is associated with the first fence identifier.

7. The method of claim 1, wherein the bitstream encoding job is performed as part of a remote rendering operation of a cloud-based gaming application.

8. The method of claim 1, further comprising:
identifying the first segment from the bitstream data prior to encoding the first segment.

9. The method of claim 1, further comprising:
in response to encoding a second segment of the bitstream data based on the second segment being independent from other segments of the bitstream data, but prior to completing encoding of the bitstream data:
indicating, using a second fence identifier, that the second segment has been encoded; and
writing the encoded second segment to the output buffer.

10. The method of claim 9, further comprising:
wherein the second segment is independent of other segments of the bitstream data based on the second segment not using data that is included in the other segments.

11. The method of claim 10, further comprising:
prior to completing encoding of the bitstream data, sending the encoded second segment from the output buffer to the consumer.

12. A system, comprising:
at least one processor; and
a non-transitory computer readable medium embodying a set of executable instructions, the set of executable instructions to manipulate the at least one processor to:
receive a bitstream encoding job to send an encoded version of bitstream data to a consumer as a bitstream; and
in response to encoding a first segment of the bitstream data based on the first segment being independent from other segments of the bitstream data, but prior to completing encoding of the bitstream data:
indicate, using a first fence identifier, that the first segment has been encoded; and
write the encoded first segment to an output buffer.

13. The system of claim 12, wherein the set of executable instructions is to manipulate the at least one processor to:
prior to completing encoding of the bitstream data, send the encoded first segment from the output buffer to the consumer.

14. The system of claim 12, wherein the first segment is independent of the other segments of the bitstream data based on the first segment being able to be processed without the other segments.

15. The system of claim 12, wherein the set of executable instructions is to manipulate the at least one processor to:
receive an indication of a plurality of segments comprising the first segment and the other segments with the bitstream data.

16. The system of claim 12, wherein the set of executable instructions is to manipulate the at least one processor to:
associate the first segment with the first fence identifier based on the first segment being independent from the other segments of the bitstream data.

17. The system of claim 12, wherein the set of executable instructions is to manipulate the at least one processor to:
receive an indication that the first segment is associated with the first fence identifier.

18. A method, comprising:
receiving, at a producer, a bitstream encoding job to send an encoded version of bitstream data to a consumer as a bitstream;
in response to encoding a first segment of the bitstream data based on the first segment being independent from other portions of the bitstream data, but prior to completing encoding of the bitstream data:
indicating, using a first fence identifier, that the first segment has been encoded; and
sending the encoded first segment to a consumer as part of the bitstream;
receiving, at the consumer, the encoded first segment as part of the bitstream; and
in response to decoding the encoded first segment but prior to completing decoding of the bitstream, indicating, using the first fence identifier, that the encoded first segment has been decoded.

19. The method of claim 18, further comprising:
subsequent to decoding the first segment, decoding the other portions of the bitstream including an encoded second segment received subsequent to the first segment.

20. The method of claim 18, further comprising:
subsequent to decoding the first segment, performing image processing operations on the first segment without performing the image processing operations on other portions of the bitstream.

* * * * *